United States Patent Office 3,746,619
Patented July 17, 1973

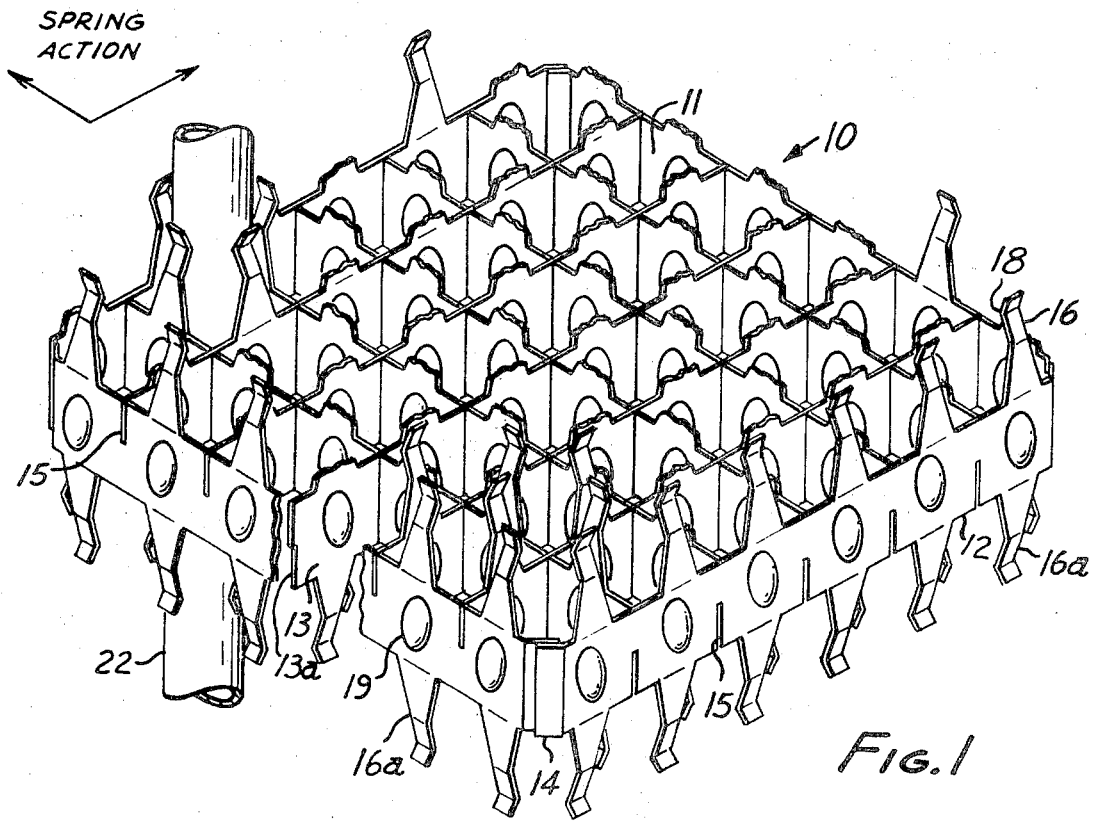
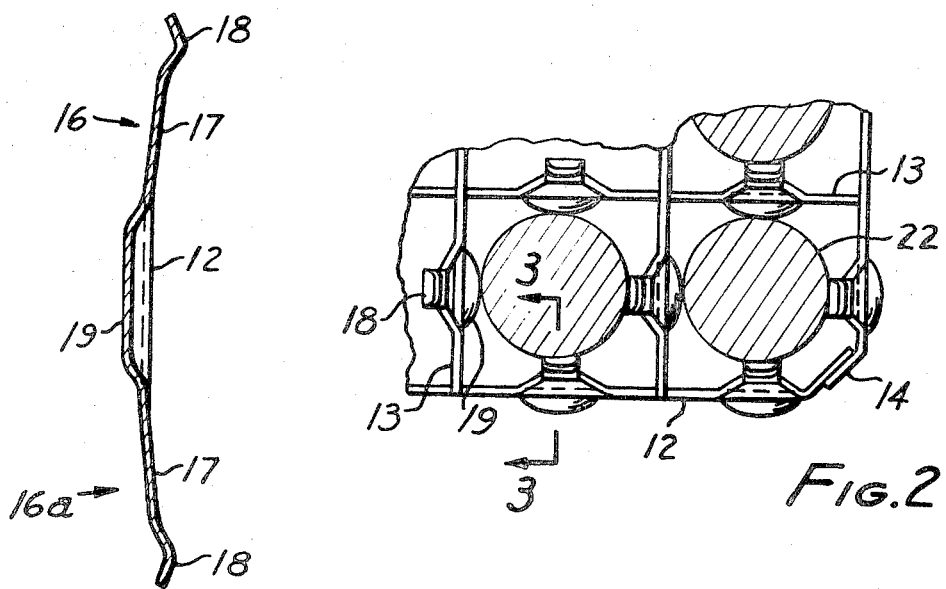

3,746,619
NUCLEAR REACTOR FUEL ELEMENT
SPACER ASSEMBLY
Kumiy R. Iwao, Lafayette, Calif., assignor to Continental
Oil Company, Ponca City, Okla.
Filed June 1, 1970, Ser. No. 41,968
Int. Cl. G21c 3/34
U.S. Cl. 176—78                                   3 Claims

ABSTRACT OF THE DISCLOSURE

A nuclear reactor fuel element spacer arrangement having a fuel rod supporting and spacing means in the form of individual cells through which respective fuel rods extend. The cells have a number of sides, some of which are provided with leaf spring members protruding above and below the cell and others of which are provide with knobs such that the fuel rod in each cell is resiliently gripped between the springs and the knobs in a manner to restrict lateral motion of the fuel rods.

---

This invention relates to nuclear fuel assemblies of the type comprising a bundle of fuel rods, and more particularly to means for supporting and spacing the fuel rods in an assembly.

An object of the invention is to provide effective restriction of lateral motion of the fuel rods held in an assembly of such rods.

Other objects are to preserve the integrity of the fuel elements and to facilitate the assembly and the flow of coolant through the assembly.

An assembly of fuel rods commonly used heretofore has involved arranging a number of fuel rods containing fissionable material in a parallel array and confined within an area, for example a square cross-sectional area, for the assembly. Provision has been made for coolant to flow past the spaced fuel rods within the space between rods and parallel to the axes of the rods so that the heat generated by the fissionable material in the rods is transferred to the coolant for such utilization as may be desired. The bundle of rods is ordinarily held at its opposite ends, and since the fuel rods have a degree of flexibility which would permit lateral motion at positions between the ends, it has been common to maintain the spacing pitch between rods and to restrict the lateral motion of the rods at positions between their ends while providing freedom for each rod to move axially under thermal expansion.

It is well known that restriction of lateral motion of the fuel rods is necessary to avoid undesirable effects such as neutron peaking, i.e. a concentration or peaking of the distribution of neutrons at a point of contact of rods, and flow channelling, i.e. a preferential flow of coolant in one of several interconnected parallel flow channels, which can cause hot spots to develop on the rods. A further reason for desiring lateral restriction is to dampen vibrations that can be lead to undesired fretting of the fuel rods, i.e. the mechanical abrasion which can occur, for example, if a fuel rod were to rub against a spacer.

For the purpose of maintaining the fuel rods in their appointed positions and spacings in the assembly and for restriction of the lateral motion, grid-like spacers for the rods have heretofore been provided.

Grid spacers heretofore generally in use for the purpose of restricting the lateral motion of the fuel rods have utilized a grid of sheet metal in what may be called an egg-crate arrangement and provided with some form of spring fingers to grip the rods.

In accordance with the present invention there is provided a grid spacer design involving a minimum of structural mass as compared with prior designs, thereby permitting ready flow of coolant. Use of the present invention, furthermore, facilitates assembly of the spacer arrangement.

The invention is carried out by use of a grid formed into adjacent cells open at the top and bottom so that fuel rods may extend through respective ones of the cells. Side walls of the cells are provided with leaf spring fingers which extend upwardly and downwardly from walls of the cells opposite which there are located protuberances so that a fuel rod placed through its cell is resiliently urged by the spring fingers against the opposite protuberances.

According to a preferred feature, the cells are formed by use of plates having spaced parallel slots extending partway through the plate from one side toward the other and the leaf spring fingers extend upwardly and downwardly from the plate at positions between the slots. Such plates form sides of spacer structure as well as the cells contained within the sides.

In forming the cells of the grid-like spacer a number of the plates are placed parallel to each other extending between two opposite side plates and another set of parallel plates are placed at an angle, normally perpendicular, to the first mentioned plates. At the place where the plates cross each other one of the crossing plates is fitted within the slot of the other. According to a preferred feature, where the plates extending inside and across the area meet the side plates, an inside plate is fitted within the slot of a side plate. The structure can be held rigid by fastening at the corners as by welding or brazing.

An advantage of this structure resides in the fact that the leaf springs can be formed without stretching the material of the spring other than in simple bending. This provides a more stable spring which is essentially free of stress.

Another feature of the arrangement is that the grid plates are formed with the protuberances which protrude from the sides of the plates.

According to another feature, the leaf springs in each of the parallel sets of plates are formed in the same direction, and also the protuberances in each of the parallel plates of a set are caused to protrude in one direction. By this arrangement there is provided the feature that in each of the cells of the grid spacer the leaf springs is urging the fuel rod toward a protrusion arrangement.

In the preferred arrangement, the sides of the enclosure are formed in a square and each of the cells is in a shape of a square with two adjacent sides provided with leaf springs and the other two adjacent sides provided with protrusions.

The foregoing and other features of the invention will be better understood from the following detailed description and the accompanying drawings of which:

FIG. 1 is an isometric view of a nuclear fuel rod spacer assembly according to this invention;

FIG. 2 is a top cross sectional view showing a detail of FIG. 1; and

FIG. 3 is a cross-section view taken at 3—3 of FIG. 2.

Referring to the drawing, there is shown nuclear fuel rod spacer assembly for supporting nuclear fuel rods, ordinarily in a vertically extending position, in an array within an area bounded by the outer sides of a grid structure 10, the outer sides forming an enclosure having a substantially square shape. Within these four sides defining the enclosure, there are formed a number of cells 11 of square cross section, there being shown six such cells along each side, although it will be understood that some other number of cells could be used, and furthermore, the enclosure could be made rectangular by using more cells along one side than along the next, if that shape were needed to fit the shape of the channel.

The parts forming this grid structure are made up of structural plates such as the side plates 12 and internal plates 13, the only difference between plates 12 and 13 being that the side plates are provided with end tabs 14 whereas the ends of plates 13 are structured to terminate flush with the sides of respective side plates.

Each plate 12 and 13 comprises a strip provided with parallel vertically extending slots 15 which extend halfway through the strip from one side thereof. Midway between each slot there extends from the plate an upwardly extending leaf spring finger 16 and a similar downwardly depending leaf spring finger 16a, there being also a pair of leaf spring fingers 16 and 16a between the end slots and the ends of the plate. The upper and lower spring fingers are inclined somewhat away from the plane of the plate at position 17 at the end of which there is formed a crook or bend 18 protruding still further from the plane of the plate. The body of the plate is provided with a plurality of protuberances 19 in the form of dimples protruding out of the plane of the plate at the opposite side from the bends 18.

The sides of the square are formed by joining the oblique tab ends of four plates 12, all of equal length, with adjacent plates perpendicular to each other. Two opposite plates of the square have their slots extending down from the top and the other two opposite plates have their slots extending up from the bottom. The proper number of internal plates 13 will then be used to complete the cellular structure within the square. Since there are six cells to a side in the structure shown, there will be needed a set of five of the plates 13 extending parallel to each other between two opposite sides of the square and an additional set of five plates 13 extending parallel to each other between the other two opposite sides of the square. The five parallel plates 13 of one of these sets are placed with their slots extending upwardly from the bottom, these being the plates extending from lower left to upper right in FIG. 1. The other set of five parallel plates 13 extending perpendicular thereto have their slots depending down from the top. The arrangement is such that the unslotted parts of plates 13 fit within the slots of the plates 13 which they cross, and the ends of plates 13 fit within respective slots of side plates 12. The ends of plates 13 which are in the slots of side plates 12 terminate flush with the outer sides of side plates 12. To permit this assembly the ends of plates 13 are suitably notched at 13a to accommodate the side plate 12. The assembly is secured to form a rigid structure by suitably welding or brazing the grid cell corners and the corners of the plates forming sides of the square. This will also serve to seal the corners to prevent crevice corrosion.

By this arrangement the bends 18 of all of the leaf springs of all the plates extending from lower left to upper right (FIG. 1) protrude in one direction into the regions above and below the cells of the grid and the bends 18 of all of the leaf springs of all the plates perpendicular thereto likewise all protrude in the same direction into the regions above and below their cells but different from the direction of the bends of the springs of the plates which extend from lower right to upper left, thereby giving spring actions in the directions of the two arrows labeled "spring-action." The arrangement also provides that the protuberances 19 will all protrude into their respective cells in the directions opposite the protrusions of the springs. Hence, two adjacent sides of each square cell will be provided with protruding springs and the other two adjacent sides of each cell will have protruding protuberances.

The dimensions of the cells and the positions of the springs and protuberances are such that each cell can be provided with a fuel rod 22 substantially centered within its cell with space all around the rod inside the cell wall, except for the dimples, and extending through the cell in a vertical direction. The relative dimensions of the fuel rods and the parts of the cell are such that the springs which are protruding will exert an effective spring action against the side of the rod, urging the rod against the protuberances on the two other sides of the cell.

In this arrangement only the bends 18 of the springs which are protruding engage the fuel rod, as the springs at the opposite sides of the cell will not engage this fuel rod, although they will engage the fuel rod in the next adjacent cell.

Ordinarily there will be more than one of the grid spacers located vertically apart from each other in a nuclear fuel rod assembly, the number of the grid spacers depending upon the length of the fuel rods.

A suitable material for the grid plates is Inconel-X, a nickel-base alloy containing copper among some other ingredients, available from International Nickel Company, Huntington, W. Va. After the brazing operation, the grid will ordinarily be age-hardened to obtain the spring property. The provision of the leaf springs above and below the cells serves to maintain a perpendicularity of the fuel rods with the mid-plane of the support grid.

It will be recognized that by the present invention there is provided a fuel tube spacer grid which is relatively simple to assemble from the plates and which is capable of firmly supporting the fuel tubes against lateral movement, thereby avoiding undesirable effects of any vibration which if present could cause fretting. It will also be recognized that the grid structure according to the present invention presents a minimum of metallic mass, hence affording freedom of coolant flow through the cells and substantially all around the fuel rods and without substantial absorption of neutrons.

What is claimed is:

1. Spacing means for nuclear reactor fuel element rods which extend in a bundle substantially parallel to each other comprising: grid means encompassing an area through which the fuel rods extend, said grid means comprising a plurality of cells open at the top and bottom within said area, each of said cells having four opposite walls and leaf springs which protrude into the region above and below said cell supported by each of two adjacent walls of the cell and knobs on the remaining two adjacent walls of the cell which protrude into the cell and between which one of the fuel rods extends wherein said leaf springs urge the fuel rod against said knobs.

2. Spacing means according to claim 1 in which the walls of the cell comprise intersecting plates, each plate comprising a horizontal strip having a plurality of spaced pairs of leaf springs, of which one leaf spring extends upward and the other, downward from the strip, each of said leaf springs having a portion which protrudes to one side of the plane of said strip, and said strip having a plurality of protuberances protruding from the other side of said strip, the protuberances being located at positions of the strip between the upper and lower leaf springs of each pair, and a plurality of slots located between adjacent pairs of leaf springs and extending part way through the strip from one edge toward the other.

3. Spacing means according to claim 1 in which the area encompassed by the grid means is substantially rectangular and the cells are substantially square.

References Cited
UNITED STATES PATENTS

| | | | |
|---|---|---|---|
| 3,510,397 | 5/1970 | Zettervall | 176—78 |
| 3,442,763 | 5/1969 | Chetter et al. | 176—78 |
| 3,255,090 | 7/1966 | Leirvik | 176—76 |
| 3,255,091 | 7/1966 | Frisch | 176—78 |
| 3,431,171 | 3/1969 | Glandin | 176—78 |
| 3,379,617 | 4/1968 | Andrews et al. | 176—78 |
| 3,398,053 | 8/1968 | Huber et al. | 176—78 |

CARL D. QUARFORTH, Primary Examiner

G. G. SOLYST, Assistant Examiner

U.S. Cl. X.R.

176—76